US 6,715,126 B1

(12) United States Patent
Chang et al.

(10) Patent No.: US 6,715,126 B1
(45) Date of Patent: Mar. 30, 2004

(54) EFFICIENT STREAMING OF SYNCHRONIZED WEB CONTENT FROM MULTIPLE SOURCES

(75) Inventors: Subrina Shih-Pan Chang, Old Tappan, NJ (US); Hua Chen, Riverside, CA (US); Jeane Shu-Chun Chen, Chappaqua, NY (US); Ephraim Feig, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,241

(22) Filed: Sep. 15, 1999

Related U.S. Application Data

(60) Provisional application No. 60/100,669, filed on Sep. 16, 1998.

(51) Int. Cl.[7] ............................................. G06F 17/00
(52) U.S. Cl. ................................................... 715/500.1
(58) Field of Search ..................... 715/500.1; 709/231

(56) References Cited

U.S. PATENT DOCUMENTS

| | | | | |
|---|---|---|---|---|
| 5,515,490 A | * | 5/1996 | Buchanan et al. | 707/500.1 |
| 5,586,235 A | * | 12/1996 | Kauffman | 707/500 |
| 5,600,775 A | * | 2/1997 | King et al. | 707/500 |
| 5,706,486 A | * | 1/1998 | Cruz et al. | 713/501 |
| 5,793,980 A | * | 8/1998 | Glaser et al. | 370/352 |
| 5,832,231 A | * | 11/1998 | Raman et al. | 709/234 |
| 5,933,835 A | * | 8/1999 | Adams et al. | 707/10 |
| 5,983,236 A | * | 11/1999 | Yager et al. | 707/104.1 |
| 5,995,091 A | * | 11/1999 | Near et al. | 707/500.1 |
| 6,006,241 A | * | 12/1999 | Purnaveja et al. | 707/512 |
| 6,151,634 A | * | 11/2000 | Glaser et al. | 709/236 |
| 6,154,773 A | * | 11/2000 | Roberts et al. | 709/219 |
| 6,211,868 B1 | * | 4/2001 | Lin et al. | 707/500.1 |
| 6,262,777 B1 | * | 7/2001 | Brewer et al. | 348/515 |
| 6,449,653 B2 | * | 9/2002 | Klemets et al. | 709/231 |
| 6,453,355 B1 | * | 9/2002 | Jones et al. | 709/230 |
| 6,487,564 B1 | * | 11/2002 | Asai et al. | 715/500.1 |
| 6,515,656 B1 | * | 2/2003 | Wittenburg et al. | 345/853 |
| 6,529,920 B1 | * | 3/2003 | Arons et al. | 715/500.1 |

* cited by examiner

*Primary Examiner*—Sanjiv Shah
(74) *Attorney, Agent, or Firm*—David M. Shofi; Anne V. Dougherty

(57) ABSTRACT

A method is described for efficiently delivering a presentation of web content comprised of a media, such as audio or video content, having defined time increments, together with one or more other content sources, such as images or events to be displayed on a monitor, synchronized so that the one ore more other images or events are displayed at predetermined time increments in the media presentation. Furthermore, the entire presentation is delivered in streaming fashion, so that the end user does not have to wait for the entirety of the content data to be downloaded before starting the presentation, but rather can start viewing and listening to the presentation after a relatively short delay period. The media data and the other content need not reside at a single server source. An authoring tool for creating such composite time-synchronous content automatically determines the necessary information for scheduling player requests to the servers. This information, together with the actual presentation content, is sent to a special player which can interpret the information and act according to its instructions.

20 Claims, 6 Drawing Sheets

HotAudio content creation tool

AAF player presentation through a Netscape browser

Flowchart for HotAudio player

EFFICIENT STREAMING OF SYNCHRONIZED WEB CONTENT FROM MULTIPLE SOURCES

CROSS REFERENCE TO RELATED APPLICATIONS

This application is related to two co-pending patent applications which are assigned to the present assignee. The applications are "Variable Rate Streaming Media Player", Ser. No. 09/293,644 and "Streaming Media Player with Synchronous Events from Multiple Sources", Ser. No: 09/396,946, based on Provisional Application No: 60/100,669 filed Sep. 16, 1998.

FIELD OF THE INVENTION

The invention relates to the presentation of information on-line and more specifically to the display of multimedia presentations wherein the various media are provided from different sources and are synchronized for presentation.

BACKGROUND OF THE INVENTION

The Internet and various intranets are well known communication networks for the transfer of digital data. While most of the data transmitted on these networks correspond to text or certain computer programs, more and more of it now pertains to multimedia content such as images, audio and video. An Internet or intranet user will request a single medium or multimedia presentation generally by implementing a technology called "hypertext linking" or "hyperlinking".

A hypertext document is one which is linked to other documents via hyperlinks. A hyperlink often appears in a hypertext document as a piece of highlighted text. Hyperlinks make it easy to follow cross-references between documents. The text is usually a word or phase describing something about which a user might wish to obtain further information. When the user activates the hyperlink, typically by clicking on it using a mouse, a link command is initiated; which causes a program at the linked address to be executed. The program execution, in turn, causes the user's view to be updated to show the linked document, typically containing more information on the highlighted word or phase. Such information may be in the form of text, audio, video, two-dimensional image or three-dimensional image. Hypertext documents with multimedia capabilities are referred to as "hypermedia documents." The regions on the screen which are active hyperlinks are called hot-links. While presently hypertext technology is most common in text and image media, it is beginning to also appear in animation, video and audio.

Nowadays, most people are familiar with the application of hypertext by using a mouse to click on a hot-link provided on a computer display of a homepage from the World Wide Web (the Web) on the Internet. Data on the Web is located via Uniform Resource Locators, or URLs. URLs comprise the draft standard for specifying an object on the Internet. Each URL specifies the access method and the location for the files. Documents on the Web are written in a simple "markup language" called HTML, which stand for Hypertext Markup Language. File formats of data on the Web are specified as MIME formats, where MIME stands for "Multipurpose Internet Mail Extensions." (Reference: on the Web at address oac.uci.edu/indiv/ehood/MIME/MIME.html). Examples of file formats on the Web are .au (probably the most common audio format), .html (HTML files), .jpg (JPEG encoded images), .mid (Midi music format), mpg (MPEG encoded video), and .ps (postscript files). In addition to being encoded in .au format, audio is also encoded in wav format and stored in files labeled with the suffix wav. Wav audio is not compresses beyond the quantization due to sampling rate and bits per sample. Radio quality audio is typically 22,050 Hz sampled at 8 bit per channel stereo, which gives an encoding at data rates of 43 KBps. Reasonable quality speech can be obtained at 11,025 Hz sampling, 8 bit mono, yielding data rates of 11 KBps. MPEG provides various standards for audio compression, typically derived from 44,100 Hz sampling stereo at 16 bit per sample. MPEG audio is typically compressed to between 16 Kbps to 384 Kbps. Other standards, such as G.723 and GSM, are tailored to speech signals and compress to 5 Kbps.

Typical Web servers follow the HTTP protocol. When a user requests the content of a URL on a server, the entire content associated with that URL is sent to the user's client machine. Such content may be comprised of an html or htm document with auxiliary information attached to it, such as images and perhaps animation software. The server will commence sending the data and continue sending same until either it has completed sending all the data or until it has received a message from the client to stop sending any more data. Some servers serve in streaming mode, wherein data is sent at some prescribed average data rate, say K bits every N seconds. A streaming server is serviced by a scheduling algorithm to maintain this average data rate.

Media players for decoding and playing audio and video have been standard features on personal computers for more than a decade. Example computer media players include the QuickTime Player of Apple Computer and the Microsoft Media Player. The players typically required that all of the data for the entire presentation be resident locally on the computer before the player starts playing. Such an arrangement means that when media content is coming from some other source on the Web, the player must wait until all content is downloaded before starting to play. Newer versions of computer media players have begun to support streaming capabilities, whereby the streaming players buffer some data from outside sources on the Web and then start playing, even though much of the data has not yet arrived. In a streaming implementation, if the data rate of the incoming data is not fast enough, the player pauses when the data in its buffer is depleted, rebuffers with more data, and then resumes play.

Streaming media have found novel new applications. One such application is the delivery of audio presentations augmented with images or transparencies. The images are displayed at appropriate time intervals during the audio playback, as prescribed by the authors of the presentation. Various technologies have been invented to accommodate such presentations. Real Networks is using a file format called SMIL, which encapsulates all the relevant information in one file. SMIL makes certain that all the data that is required to be provided at a particular point in a presentation is already present in one file at the client at that instant, and then streams this file using a streaming server at some prescribed data rate. Microsoft's NetShow utilizes a similar scheme but with its ASF data format. All known techniques for delivery of such synchronized content utilize multiplexing of all of the content into a single file, followed by streaming that file using a streaming server. Often, however, the two requirements of a single file and a streaming server are undesirable added complexities.

What is desirable, therefore, is a system and method for enabling the presentation of time synchronous content without the requirements of creating a single file and of including a streaming server.

It is also desirable that the system and method be capable of providing a synchronous presentation even if the various files do not reside on the same server.

It is an objective of the present invention, therefore to provide such a system and method.

SUMMARY OF THE INVENTION

The invention is concerned with the delivery of data from one or more sources, typically web servers, over a communications network such as the Web or an intranet, to end users who are typically deploying computers. The data is coded content information comprising a time synchronous, so-called "primary", media, such as audio or video, together with various other so called "secondary" media from the same or other sources, such as images or events to be displayed on a monitor, synchronized to appear at predetermined time points in the media presentation. For example, the data may comprise all the information required for the presentation of a lecture using audio and images of accompanying transparencies, where each transparency is displayed at an appropriate interval of time during the audio presentation. The presentation is delivered in streaming fashion, so that the end user does not have to wait for the entirety of the data to be downloaded before starting the presentation, but rather can start viewing and listening to the presentation after a relatively short transmission period.

The invention comprises a content creation tool for preparing the data in an appropriate format with appropriate auxiliary information, the format (called HotAudio file, or haf) for the data, and a player (called HotAudio player, which is the subject of a co-pending patent application Ser. No. 09/396,946) that can utilize the information in the formatted data so that the end user experience is pleasant. The auxiliary information in the formatted data is used by the player to schedule its requests from the servers on which the various images or events for the presentation reside.

Ideally, after an initial relatively short, delay comprising the initial transmission period, the presentation proceeds without interruption. In case of network congestion, as often happens on the Web, the pauses that will invariably occur are handled so as to minimize the degradation of the overall experience. For example, if secondary data for an event has not been received by the time the player needs it, the primary media playback pauses and the player stops receiving primary media data until all the necessary secondary event data has arrived. Once the necessary secondary event data has arrived, the player resumes it normal mode of operation.

The invention is ideally suited for streaming media players that do not utilize special streaming servers. The invention does not require that the primary media data and the secondary event data be multiplexed into a single streaming file.

BRIEF DESCRIPTION OF THE INVENTION

The invention will now be described in greater detail with reference to the appended drawings wherein:

FIG. 1 provides an overview of the system for implementing the present invention;

FIG. 2 illustrates a HotAudio file format in accordance with the present invention;

FIG. 3 provides a representation of the display generated by the HotAudio content creation tool of the present invention;

DETAILED DESCRIPTION OF THE INVENTION

Figure 1:
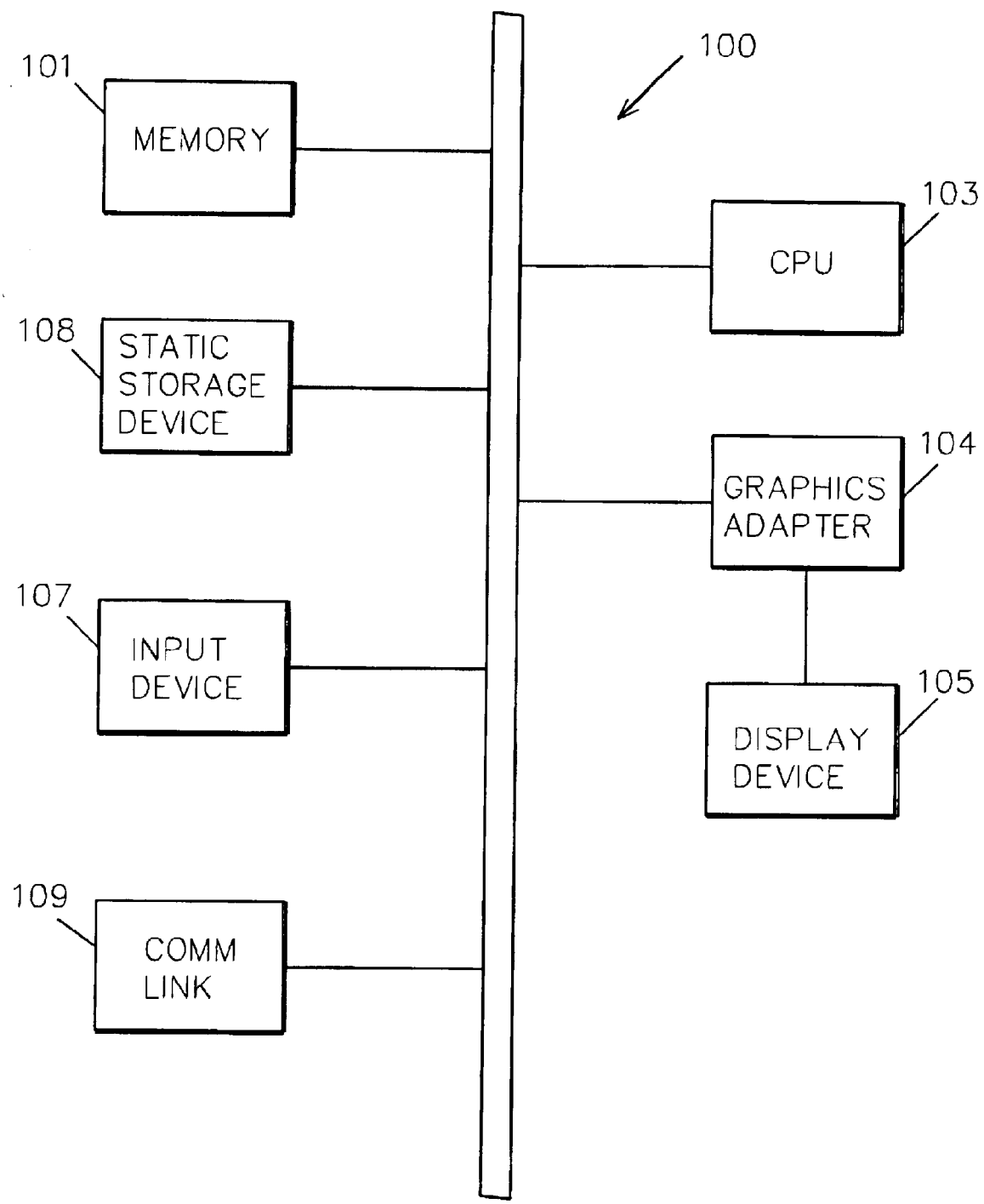

The present invention may be implemented for use on any computer processing system including, for example, a personal computer or a workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile storage location 108, such as a read only memory (ROM) and/or other nonvolatile storage devices such as a fixed disk drive, that stores an operating system and one or more application programs that are loaded into the memory 101 and executed by the CPU 103. In the execution of the operating system and application program (s), the CPU may use data stored in the nonvolatile storage device 108 and/or memory 101. In addition, the computer processing system optimally includes a graphics adapter 104 coupled between the CPU 103 and a display device 105 such as a CRT display or LCD display. The application program and/or operating system executed by the CPU 103 generates graphics commands, for example, a command to draw a box (or window), a command to display a bit map image, a command to render a three-dimensional model, or a command to display a video file. Such commands may be handled by the application program/operating system executed by the CPU 103, or by hardware that works in conjunction with the application program/operating system executed by the CPU 103, wherein the appropriate pixel data is generated and the display at the display device 105 is updated accordingly.

In addition, the computer processing system may include a communication link 109 (such as a network adapter, RF link, or modem) coupled to the CPU 103, which link allows the CPU 103 to communicate with other computer processing systems over a communications network, for example over the Internet. The CPU 103 may receive portions of the operating system, portions of the application program(s), or portions of the data used by the CPU 103 in executing the operating system and application program(s) over the communication link 109.

It should be noted that the application program(s)/operating system executed by the CPU 103 may perform the methods of the present invention described below. Alternatively, portions or all of the methods described below may be embodied in hardware that works in conjunction with the application program/operating system executed by the CPU 103. In addition, the methods described below may be embodied in a distributed processing system whereby portions of such methods are distributed among two or more processing systems that are linked together via communication link 109.

For the purposes of this description, the terms "media data", and/or "source" or "primary media data", as distinguished from "event data" and/or "secondary data" are used for ease of description. It is to be understood that these are representative terms which do not limit the type of content, the importance of the content to the presentation, or the order of the content for display.

Figure 2:
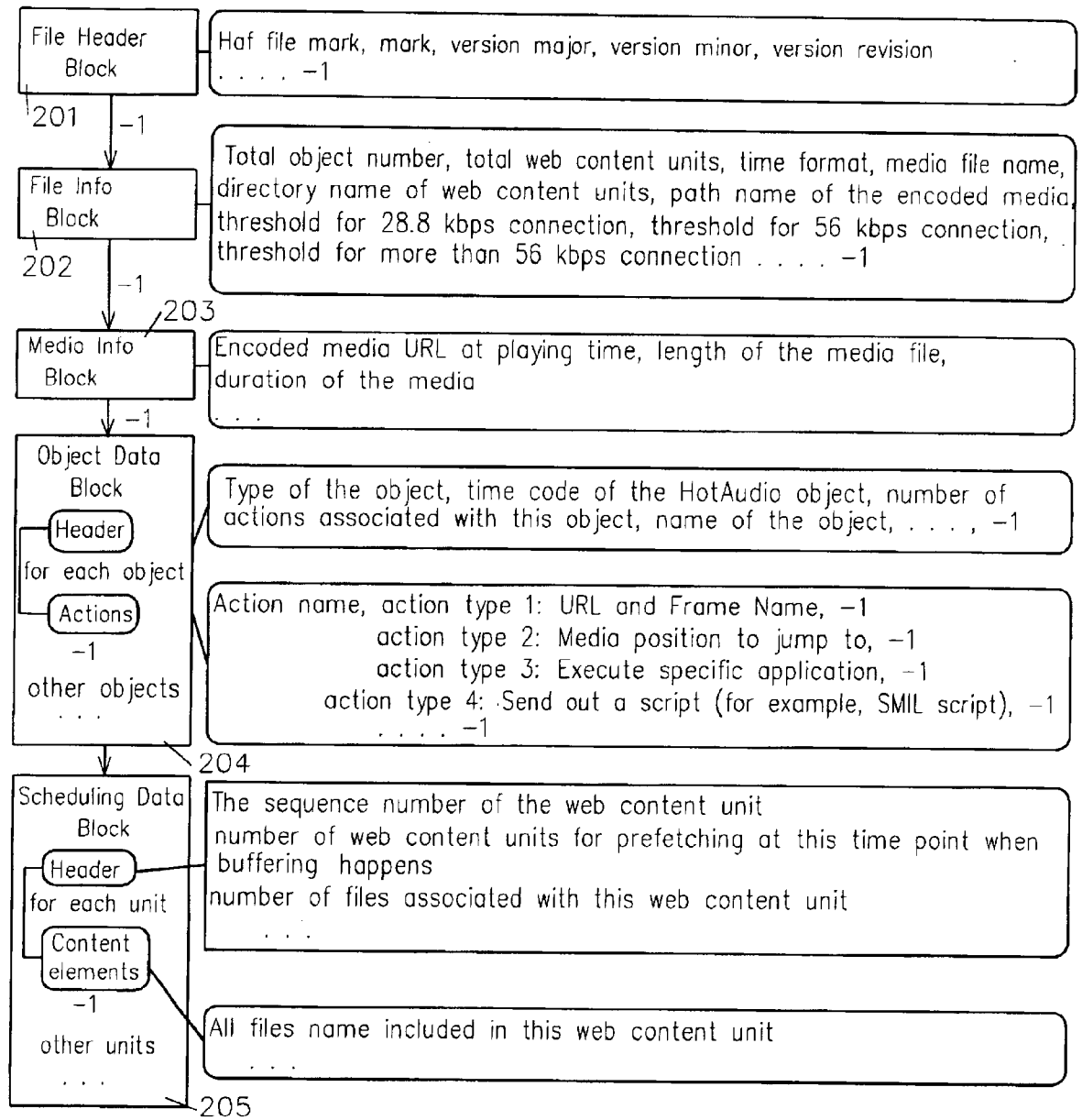

A preferred embodiment of the present invention comprises a system and method for providing a new data type called a HotAudio file. A HotAudio file contains metadata information regarding time-driven actions associated with a media source such as video or audio. In the present embodiment, the primary data source is audio; however, extensions to other media types such as video will be apparent to anyone familiar with the art of computer multimedia. The file format consists of data blocks. A data block consists of various data records or simply records. HotAudio comprises five types of data blocks: Header Block, File Information Block, Media Information Block, Object Data Block, and Scheduling Data Block. An Object Data Block may contain records which in turn contain sub-records; the other data blocks contain records but no sub-records. FIG. 2 presents the structure of the HotAudio (haf) file format.

Each record contains arrays fieldname, fieldlength and fieldvalue, perhaps several of them per record. A record associated with an Object Data Block may contain sub-records. Each sub-record is also an array of one or several fieldname, fieldlength and fieldvalue trios. An example of an haf data block follows:

```
Record1:fieldname1, fieldlength1, fieldvalue1, fieldname2, fieldlength2,
    fieldvalue2, . . . -1
Record2:fieldname1, fieldlength1, fieldvalue1, sub-record1,
    sub-record2, . . . -1
sub-record1:fieldname11, fieldlength12, fieldvalue13, fieldname21,
    fieldlength22, fieldvalue12, . . . -1
sub-record2:fieldname11, fieldlength12, fieldvalue13, fieldname21,
    fieldlength22, fieldvalue12, . . . -1
```

The value −1 is used as the delimiter between records and sub-records. When an haf parser (part of a HotAudio player) encounters a "−1", if the current data block only contains one single record, it proceeds to treat the data following it as a new record in the next data block; Otherwise, it proceeds to treat the data following it as a new record in the same data block.

A data record in the Header Block 201 consists of the value of five fields. The name, date type, date length, and sample value of each field are given in Table 1.

TABLE 1

Structure of a sample haf Header Block

| Field Name | Data Type | Data Length (bytes) | Data Value |
|---|---|---|---|
| haf file mark | string | 22 | "HotAudio Content File." |
| mark | byte | 1 | 0x1A |
| Version Major | byte | 1 | 1 |
| Version Minor | byte | 1 | 0 |
| Version Revision | integer | 2 | 0 |

A data record in the File Information Block 202 consists of four data fields. Each data field contains three values: the first is a constant value representing the field, the second is the length of the data value, and the third is the data value of the field. Table 2 gives the constant values representing each field in the present embodiment.

TABLE 2

Structure of a File Information Block

| Field Name | Constant Value | Description |
|---|---|---|
| FFT_OBJECTNUM | | Total number of objects in this file |
| FFT_SEQUENCENUM | 3 | Total number of web content units |
| FFT_TimeFormat | 4 | Time format of this file, frame or ms |
| FFT_EDITMEDIANAME | 5 | Media filename at design time |
| FFT_EDITFOILPATH | 6 | Foil directory name at design time |
| FFT_StreamMediaPath | 7 | Path name of the Encoded Media |
| FFT_THRESHOLD_288 | 8 | Threshhold for 28.8 kbps connection |
| FFT_THRESHOLD_56 | 9 | Threshhold for 56 kbps connection |
| FFT_THRESHOLD_56HIGH | 10 | Threshhold for more than 56 kps connection |

The data type, data length, and sample value of each field in the File Information Block are given in Table 3:

TABLE 3

Data type, data length, and sample value of fields in a File Information Block

| Field Name | Data Type | Data Length (byte) | Data Value |
|---|---|---|---|
| FFT_OBJECTNUM | integer | 2 | |
| FFT_SEQUENCENUM | long | 4 | |
| FFT_TimeFormat | integer | 2 | 1: frame, 2: ms |
| FFT_EDITMEDIANAME | string | len (filename) | |
| FFT_EDITFOILPATH | string | len (foilpath) | |
| FFT_StreamMediaPath | string | len (StreamingMediaPath) | |
| FFT_THRESHOLD_288 | long | 4 | |
| FFT_THRESHOLD_56 | long | 4 | |
| FFT_THRESHOLD_56HIGH | long | 4 | |

A data record in the Media Information Block 203 consists of five data fields. Each data field contains three values: the first is a constant value representing the field, the second is the length of the data value, and the third is the data value of the field. Table 4 gives the structure of a Media Information Block.

TABLE 4

Structure of a Media Information Block

| Field Name | Constant Value | Description |
|---|---|---|
| VFT_URL | 1 | Media URL at play time |
| VFT_FILELEN | 2 | Length of the media file |
| VFT_FRAMERATE | 3 | Frame rate of the video |
| VFT_FRAMENUM | 4 | Frame number of the video |
| VFT_MEDIADURATION | 8 | Duration of the media |

The data type, data length, and the data value unit of each field are then given in table 5.

TABLE 5

Data type, data length, and data value units of fields in a Media Information Block

| Field Name | Data Type | Data Length (byte) | Data Value Unit |
|---|---|---|---|
| VFT_URL | string | len (URL) | |
| VFT_FILELEN | long | 4 | in bytes |
| VFT_FRAMERATE | float | 4 | frames per second |
| VFT_FRAMENUM | long | 4 | |
| VFT_MEDIADURATION | float | 4 | in seconds |

TABLE 6

Header portion of an Object Data Block

| Field Name | Constant Value | Description |
|---|---|---|
| OFT_TYPE | 1 | Type of the object |
| OFT_TIME | 2 | Time code of the HotAudio object |
| OFT_ACTION_NO | 3 | Number of actions associated with this object |
| OFT_NAME | 4 | Name of the object |

| Field Name | Data Type | Data Length (byte) | Data Value |
|---|---|---|---|
| OFT_TYPE | int | 2 | 5 for HotAudio object |
| OFT_NAME | string | len (ObjectName) | |
| OFT_TIME | long | 4 | Time code in miliseconds |
| OFT_ACTION_NO | int | 2 | |

HotAudio supports the following actions: link to URL, jump to certain position in the primary media, execute application, send out a script. Multiple actions can be triggered by one time object. For example, the actions triggered at time t1 can be "forward to time t2, load URL1 at Frame1, load URL2 at Frame2, launch a Chat application". Each action contains two fields of data pairs, the first data pair being action name and the second data pair being action type. The field data values for this portion are defined in Table 7.

TABLE 7

Action portion of an Object Data Block

| Field Name | Constant Value | Description | Data Type | Data Length (byte) | Data Value |
|---|---|---|---|---|---|
| OFT_ACTION_NAME | 5 | Action Name: Name of a specified action | string | len (ActionName) | string (ActionName) |
| OFT_URL_FRAME | 11 | Action type 1: URL and Frame Name | string | len (strUrlFrame) | string (URL) + "&&" + string (Frame Name) |
| OFT_JumpTo | 12 | Action type 2: Media position to jump to | long | 4 | |
| OFT_Exec | 13 | Action type 3: Execute specific application | string | len (invoking command) | Command to invoke specific application any script file |
| OFT_Script | 14 | Action type 4: Send out a script | string | | |

A data record in the Object Data Block 204 corresponds to a time code in the audio. Actions will be triggered by the time code. The record contains two portions: the Header portion and the Action portion. The Header portion is the fixed length portion containing four data fields and the Action portion is the variable length portion containing multiple sub-records. Each sub-record consists of two data fields and represents an action to be invoked by this object. Following the same convention as in the above data blocks, each data field contains three values: the first is a constant value representing the field, the second is the length of the data value, and the third is the data value of the field. They are defined in Table 6.

A data record in the Web Content Scheduling Data Block 205 corresponds to a time code in the audio (i.e., primary data), the sequence number of the web content unit, file number and file name of each web content unit, and the number of web content units that shall have been pre-fetched by the time that the buffering happens. It contains two portions: the Header portion and the Web Content Unit portion. The Header portion is a fixed length portion containing a file list which includes file names associated with current Web content. Following the same convention as in the above data blocks, each data field contains three values: the first is a constant value representing the field, the second is the length of the data value, and the third is the data value of the field. They are described in Tables 8 and 9.

TABLE 8

Header portion of an Scheduling Data Block

| Field Name | Constant Value | Description | Data Type | Data Length (byte) | Data Value |
|---|---|---|---|---|---|
| FOIL_UNIT_SEQNO | 110 | The sequence number of the web content unit | long | 4 | |
| FOIL_UNIT_BUFFERSIZE | 111 | Number of web content units for fetching at this time point when the buffering happens | integer | 2 | number of web content units |
| FOIL_UNIT_FILENUM | 112 | Number of files associated with this web content unit | integer | 2 | number of files in one web content units |

TABLE 9

Content Unit portion of an Scheduling Data Block

| Field Name | Constant Value | Description | Data Type | Data Length (byte) | Data Value |
|---|---|---|---|---|---|
| FOIL_UNIT_FILENAME | 113 | Name of the file included in the content unit | string | len(FileName) | |

Figure 3:
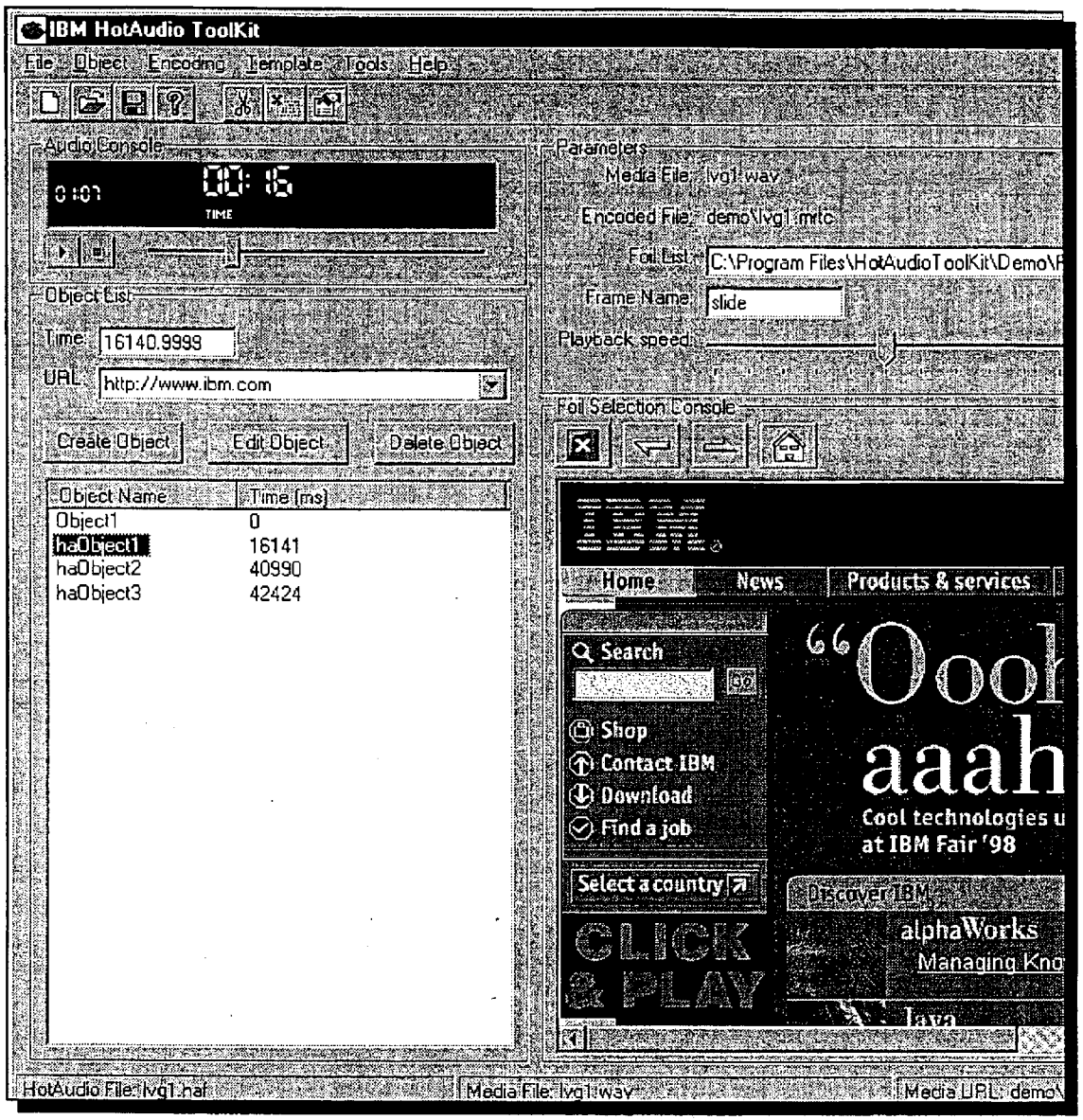

Whereas all the data describing the content and actions are chosen and input by the presentation author using the HotAudio content creation tool, the actual parameters for the scheduling are generated automatically by the authoring tool. The HotAudio creation tool of the present embodiment, pictured in FIG. 3, is implemented as a Windows based software program, with standard Windows drag-and-drop visual user interface. Preview capabilities allow an author to view the presentation while it is being created. The novel feature of the HotAudio content creation tool is the algorithm it uses to schedule the requests that a HotAudio player will make to prefetch the various secondary components, such as images and/or events, that accompany the streaming media in synchronous fashion.

Figure 4:
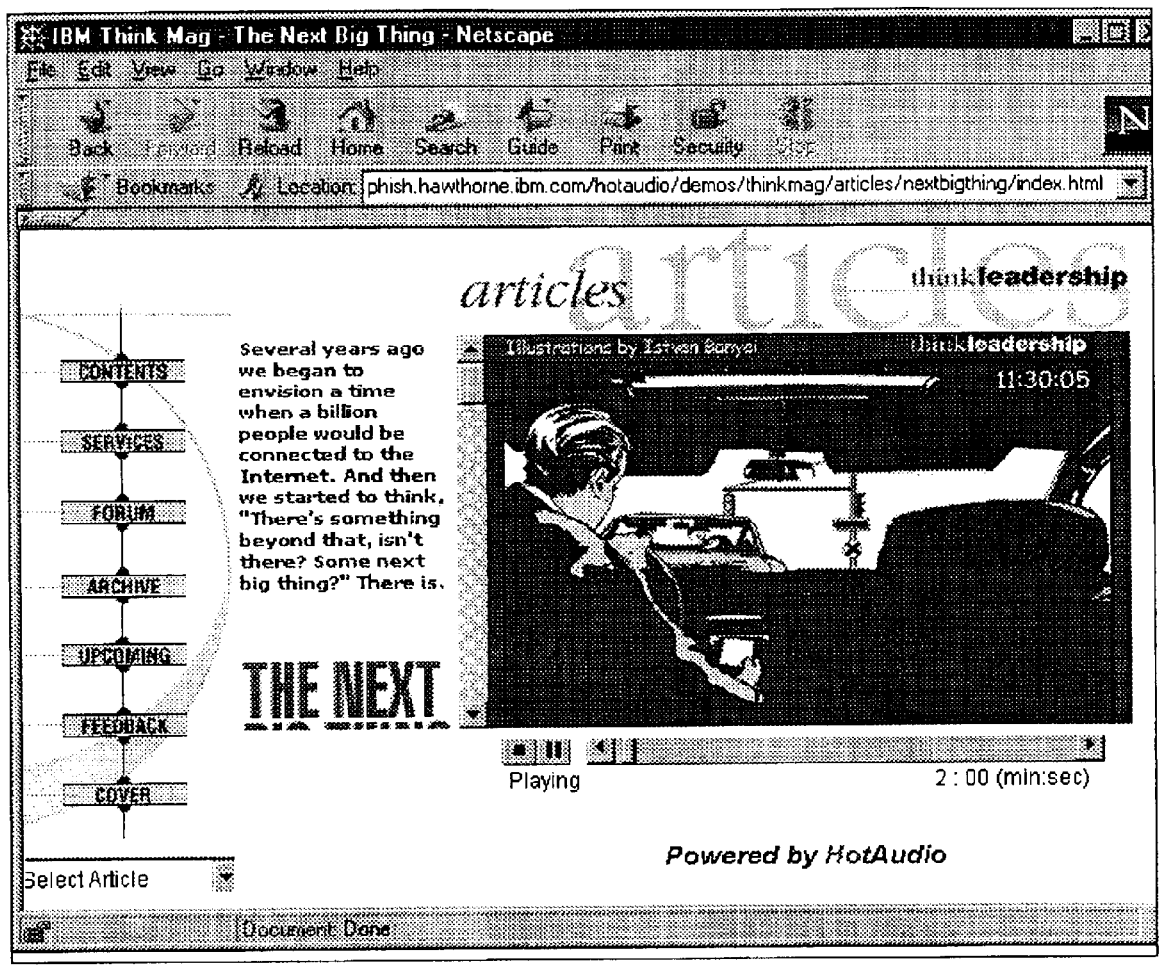
FIG. 4 shows a representation of a screen with a HotAudio presentation generated through a Netscape browser.

Media files are opened by clicking on the File menu button. The Object button is used to either create, delete or edit an object. Uncompressed media files are encoded using compression encoding algorithms accessible via the Encoding button. The creation tool supports various templates for the actual display of HotAudio content, which templates are accessible via that Template button. One such template with optimal, though in some cases not necessary, features is shown in FIG. 4, displayed using a Netscape browser. The Tools button gives access to various wizards that are helpful in content creation. The Help button opens a help file. A standard media player is embedded in the content creation tool, so that the author can preview the media content during creation. Likewise, space is provided in the tool so that the author can preview images to be used in the presentation. The author can input information about objects in the Object List box. Shortcuts for Create Object, Edit Object and Delete Object are given. Object names and their associated critical times are displayed. The Foil Selection Console follows a standard browser paradigm, with navigation forward, backward, stop and Home, which is the first foil (transparency or other image) of the presentation.

To describe the algorithm for determining the scheduling parameters which are then transmitted to the client player via the haf file, the following definition is required: a "Web Content Unit" or WCU is the complete event which is executed at any of the prescribed time points in the presentation, and comprises the hyperlinked html files and their embedded image or other MIME type elements. In the HotAudio File Format, a single time object links to a single WCU. The pseudo-code below gives an example of an WCU, which is an hmtl file that calls on one JPEG and two GIF files.

<html>
<head>
<title>Demo page: Web Content Unit</title>
</head>
<body background="bg.gif">
<p align="center"><font size="4">Demo page:Web Content Unit 1<font></p>
<img src="image/image1.jpg" width="129" height="89"></p>
<img src="image/image2.gif" width=:88"height="85"></p>
</body>
</html>

Given the situation wherein a HotAudio author wants to create an action to call for displaying the content of the above-illustrated file at some specific time in the presentation, the author needs to ensure that the player will have all the necessary content local before such time period. An html parser in the content creation tool extracts the information regarding the embedded image files in the html file and automatically builds the associated WCU which comprises the html file and the three image files. It then determines which of the data for the WCU would not yet have been accessed, and adds them and the associated parameters to the Scheduling Data Block. By the time the HotAudio player parses the haf file, it will have all the necessary information to prefetch exactly the right data that needs to be present at the appropriate time for the presentation. It is to be noted that a single object may have multiple URL actions, and the union of all content used in displaying or otherwise executing all the actions comprise one WCU associated with this object.

The creation tool determines how many and which WCUs a HotAudio player should have prefetched by any of the critical time points of the presentation. Suppose there are n time objects associated with n critical time points and n web content units. The time objects are sorted as t1<t2< . . . <tn.

Figure 5:
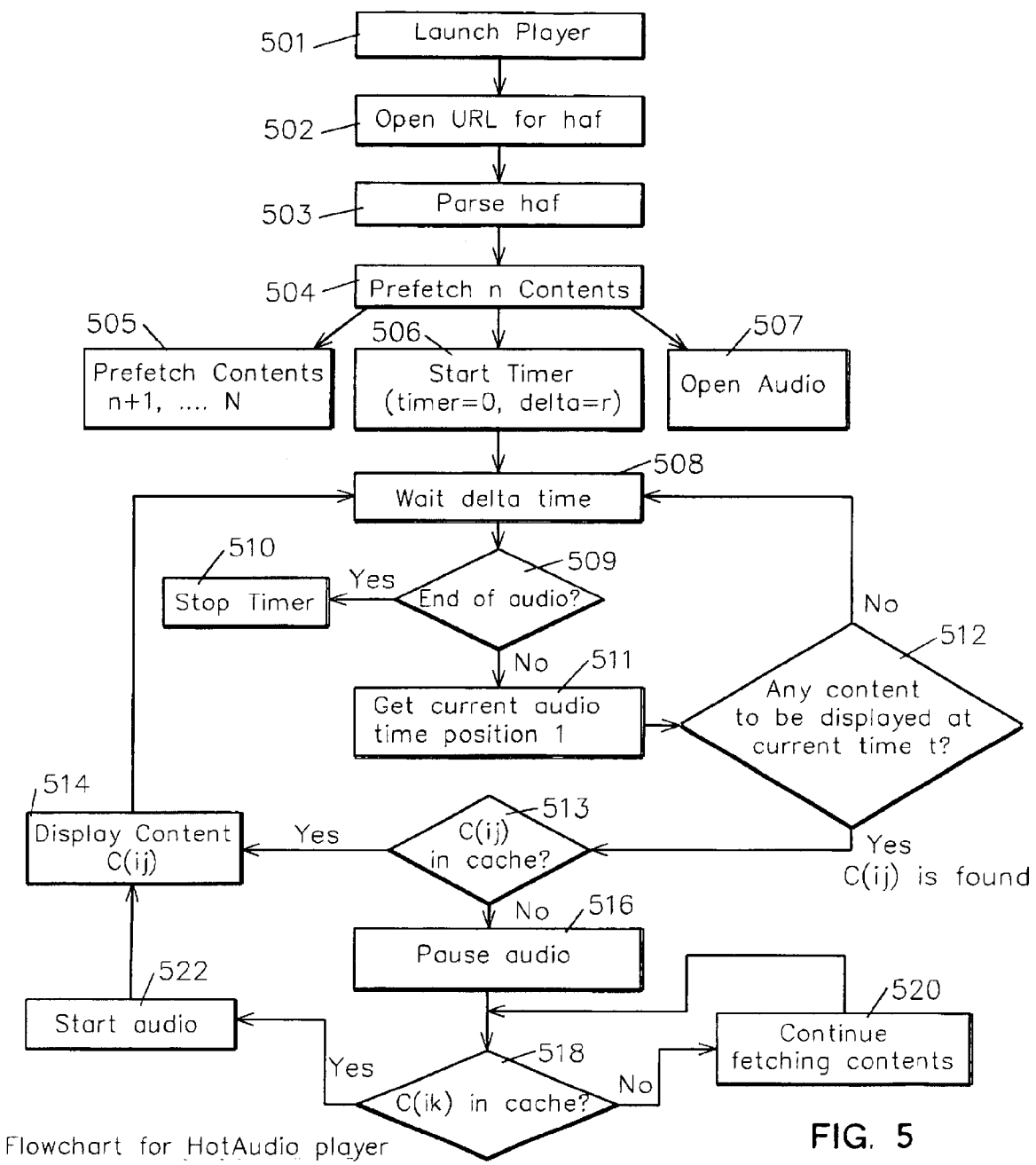
FIG. 5 illustrates a representative flowchart of the operations of the HotAudio player.
Figure 6:
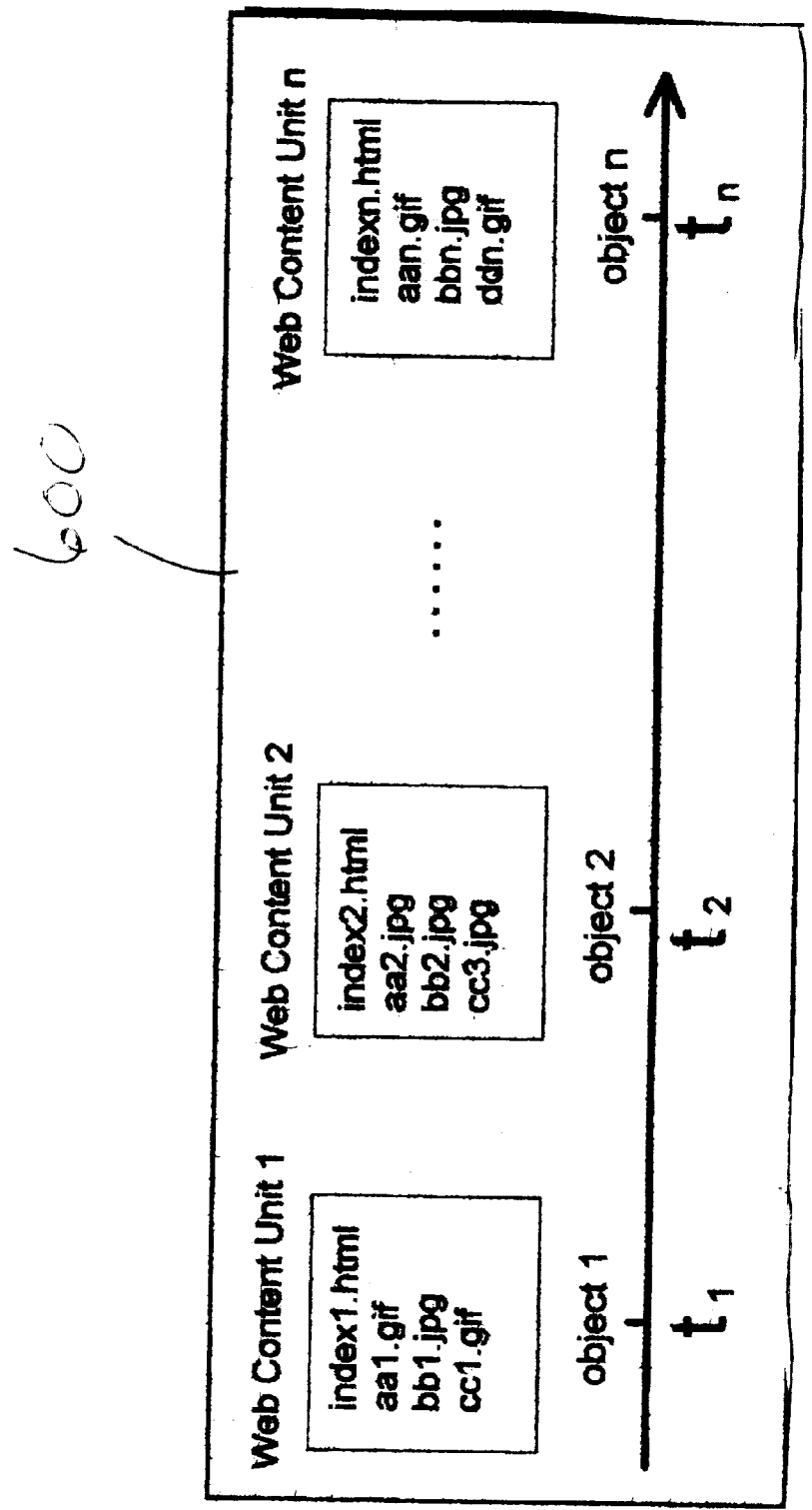
FIG. 6 illustrates an example of a HotAudio presentation.

In the representation of the HotAudio presentation shown at 600 in FIG. 5, wherein at time tj, the event WCU(j) is executed, the contents comprising the WCU(j) are displayed in the boxes underneath the labels.

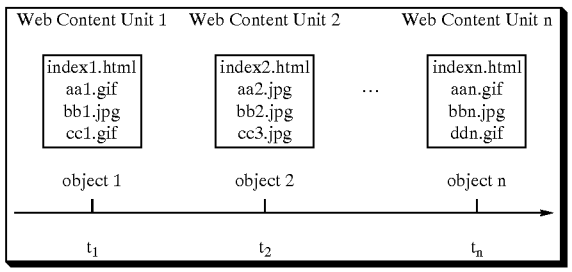

The author designs the presentation to be delivered at a certain bit rate, Bl kbps. As before, in this embodiment, the presentation is audio accompanied by time-synchronized images. The audio is encoded at Ba kbps, with Ba <Bl. For example, a presentation for delivery over standard phone lines can be designed at 20 kbps with audio encoded at 8 kbps, as envisioned for delivery via a 28.8 kbps modem. An assumption is made that the connection delay time for accessing a URL is Tc; that is, the time between a client request and the beginning of the data arrival at the client is Tc. The file sizes Fsize(1), Fsize(2), . . . Fsize(n) of the WCUs are determined by the creation tool. Fnumber (i) represent the number of the files included in WCU(i), the i-th Web Content Unit. Define Bavailable=Bl−Ba, where Bavailable is, essentially, the bandwidth allocated for the delivery of all of the content that is augmented to the audio in making the presentation. The algorithm deployed is presented below:

```
For i=1, . . ., n−1,
    Step 1: Nsize (i)=1, L=i,
    Step 2: Tfetch (L+1)=Fsize(L+1)/Bavailable+(Tc*Fnumber)
    Step 3: Tfetch (L+1)>=t(L+1)−tL Then:
        Nsize (i)=Nsize(i)+1;
        L = L+1;
        if L<n then go to step 3;
        otherwise Stop.
```

FIG. 4 gives a view of a HotAudio presentation through a Netscape browser. The scrollbar below the image and the buttons near it control the audio in typical Media Player fashion. The images above the scrollbar are updated dynamically during the presentation at appropriate predetermined time points in the presentation. The entire presentation is embedded in an html page which contains other content.

FIG. 5 presents a flowchart of the HotAudio player. A user of application launches the HotAudio player at 501. The player requests the haf file from the appropriate URL at 502. When the haf file arrives, the player parses its contents at 503 and then prefetches Nsize(1) WCUs from their locations at 504. Once all have arrived, the player launches a timer at 506 and the audio player at 507, and simultaneously continues to prefetch the ensing WCUs at 505. When the timer indicates a critical time point ti, for example when an image has to be displayed or some event executed as shown at 508, the player checks if the contents C(ij) for that event are present in a local cache at 508–513. If they are present, the contents are rendered and displayed or executed at 514. If the contents are not present, the audio is paused at 516, and the HotAudio player continues prefetching at 518 and 520 until all of the contents C(ij) associated with WCU(i) are present in the cache. Once all of the necessary contents are present, the HotAudio player will proceed with the audio at 522 and the synchronized presentation.

The invention has been described with reference to several preferred embodiments. It will be understood by one skilled in the relevant art that modifications can be made without departing from the spirit and scope of the invention as set forth in the appended claims.

Having thus described our invention, what we claim is the following:

1. A method for creating a multimedia presentation for display be a media player without first creating a single stream, said multimedia presentation comprising content from a primary media source having time increments and content from at least one secondary media source, said method comprising the steps of:

receiving user synchronization input regarding synchronization of the display of the content from the at least one secondary media source to time increments in the content from the primary media source;

creating a file comprising at least the identity of the primary media source, the identity of the at least one secondary media source, and the synchronization input; and automatically determining a schedule of actions for a media player to dynamically assemble portions of content from the primary and the at least one secondary media source for simultaneous display without first creating a single stream.

2. The method of claim 1 wherein said automatically determining comprises the steps of:

assembling a plurality of content units, wherein each content unit comprises information regarding the content to be displayed at a given time increment; and scheduling prefetching of portions of content from at least one media source for each content unit.

3. The method of claim 1 wherein said content from the at least one secondary media source comprises at least one of image, event, audio and video content.

4. The method of claim 1 further comprising allotting necessary bandwidth for said presentation.

5. The method of claim 4 wherein said necessary bandwidth comprises at least the bandwidth required for said primary content plus the maximum bandwidth required by any portion of content from the at least one secondary media source.

6. The method of claim 1 wherein primary and said at least one secondary sources are at different locations.

7. A system for creating a multimedia presentation for display be a media player without first creating a single stream, said multimedia presentation comprising content from a primary media source having time increments and content from at least one secondary media source, comprising:

input means for receiving user synchronization input regarding synchronization of the display of the content from the at least one secondary media source to time increments in the content from the primary media source;

at least one file creation component for creating a file comprising at least the identity of the primary media source, the identity of the at least one secondary media source, and the synchronization input; and at least one scheduler component for automatically determining a schedule of actions for a media player to dynamically assemble portions of content from the primary and the at least one secondary media source for simultaneous display without first creating a single stream.

8. The system of claim 7, further comprising preview means for displaying a preview of the multimedia presentation to the user.

9. The system of claim 8, wherein the preview means comprises a media player.

10. A program storage device readable by machine, tangibly embodying a program of instructions executable by the machine to perform method steps for creating a multimedia presentation for display be a media player without first creating a single stream, said multimedia presentation comprising content from a primary media source having time increments and content from at least one secondary media source, said method steps comprising:

receiving user synchronization input regarding synchronization of the display of the content from the at least one secondary media source to time increments in the content from the primary media source;

creating a file comprising at least the identity of the primary media source, the identity of the at least one secondary media source, and the synchronization input; and automatically determining a schedule of actions for a media player to dynamically assemble portions of content from the primary and the at least one secondary media source for simultaneous display without first creating a single stream.

11. A file format for instructing a media player to display a multimedia presentation comprising content from a primary media source having time increments and content from at least one secondary media source dynamically displayed without first creating a single stream comprising:

identification information for identifying the primary and at least one secondary media content;

timing information comprising the time increments in the primary content at which to display portions of the secondary media content; and schedule information comprising a schedule for said media player to dynamically prefetch each portion of secondary media content to local cache prior to the time increments for display of said portion simultaneously with display of said primary content.

12. The file format of claim 11, further comprising header information identifying said file.

13. The file format of claim 11, further comprising location information comprising the primary and at least one secondary sources for the primary and at lest one secondary media content.

14. A method for a media player, having at least one local cache, for displaying a multimedia presentation from more than one source without creating a single stream comprising the steps of: receiving a presentation file comprising the identity and location of sources for primary and at least one secondary media content along with synchronization information comprising the pre-specified time increments in said primary media content at which each portion of content from said at least one secondary media content is to be displayed and a schedule for prefetching content;

prefetching a first portion of said primary media content to said at least one local cache;

when said first portion of primary content is prefetched, commencing playing of said primary content;

fetching successive portions of said primary content and portions of said at least one secondary content to said at least one local cache during said playing;

monitoring the time increments of said primary media content as it is being displayed;

at each pre-specified time increment, determining if the portion of content from the at least one secondary media content to be displayed at that time increment has been received in said at least one local cache;

retrieving said specified portion of content from the at least one secondary media content from the local cache and displaying said retrieved specified portion simultaneously with displaying of said primary content when it has been prefetched; and when the specified portion of content from the at least one secondary media content has not been prefetched to said local cache, pausing display of primary content until said specified portion is in said local cache.

15. The method of claim 14 further comprising the step of prefetching portions of the at least one secondary media content.

16. The method of claim 15 wherein said prefetching comprises invoking said schedule for prefetching content.

17. The method of claim 14 wherein said primary media content comprises audio content and wherein said at least one secondary media content comprises one of image, video and event media content.

18. A media player for displaying a multimedia presentation comprising:

processing component for receiving and parsing a presentation file comprising the locations of sources for primary and at least one secondary media content, the identity of the primary and at least one secondary media content along with synchronization information comprising the pre-specified time increments in said primary media content at which each portion of content from said at least one secondary media content is to be displayed and a schedule for prefetching content;

at least one local cache for storing primary and secondary media content;

communication means for establishing communication with the locations of said sources for the primary and at least one secondary media content and for receiving media content from said sources;

playback means for rendering said primary content by streaming and for rendering portions of said secondary content simultaneously with said primary content at pre-specified time increments in said primary content, said rendering performed without creating a single stream; and timer means for monitoring the time increments of said primary media content at it is rendered.

19. The media player of claim 18 further comprising determining means for determining if a portion of secondary media content to be displayed with said primary content at a time increment is available at said at least one local cached and for signaling said playback means to pause until said portion is available at said local cache.

20. A program storage device readable by machine, tangibly embodying a program of instructions executable by the machine to perform method steps for a media player having at least one local cache to display a multimedia presentation without creating a single stream, said method comprising the steps of:

receiving a presentation file comprising the identity and location of sources for primary and at least one secondary media content along with synchronization information comprising the pre-specified time increments in said primary media content at which each portion of content from said at least one secondary media content is to be displayed and a schedule for prefetching content;

prefetching a first portion of said primary media content to said at least one local cache;

when said first portion of primary content is prefetched, commencing playing of said primary content;

fetching successive portions of said primary content and portions of said at least one secondary content to said at least one local cache during said playing;

monitoring the time increments of said primary media content as it is being displayed;

at each pre-specified time increment, determining if the portion of content from the at least one secondary media content to be displayed at that time increment has been received in said at least one local cache;

retrieving said specified portion of content from the at least one secondary media content from the local cache and displaying said retrieved specified portion simultaneously with said primary content when it has been prefetched; and when the specified portion of content from the at least one secondary media content has not been prefetched to said local cache, pausing display of primary content until said specified portion is in said local cache.

* * * * *